United States Patent [19]  
Kabasin et al.

[11] Patent Number: 4,721,176
[45] Date of Patent: Jan. 26, 1988

[54] VEHICLE TRACTION CONTROL SYSTEM
[75] Inventors: Daniel F. Kabasin, Rochester; Donald D. Stoltman, Henrietta, both of N.Y.
[73] Assignee: General Motors Corporation, Detroit, Mich.
[21] Appl. No.: 935,971
[22] Filed: Nov. 28, 1986

Related U.S. Application Data

[63] Continuation-in-part of Ser. No. 874,073, Jun. 13, 1986, abandoned.

[51] Int. Cl.⁴ ............................................. B60K 31/00
[52] U.S. Cl. ................................. 180/197; 123/333; 123/361; 123/399
[58] Field of Search ................. 180/197; 123/198 DB, 123/333, 344, 350, 361, 399, 478, 481, 334, 335; 303/96, 97

[56] References Cited
U.S. PATENT DOCUMENTS 3,680,655 8/1972 Beyerlein et al. .................. 180/54.1
3,684,047 8/1972 Zeisloft et al. ..................... 180/197
3,752,249 8/1973 Gelenius et al. .................... 180/197
3,938,611 2/1976 Bertolasi ............................ 180/197
3,938,612 2/1976 Boudeville et al. ................ 180/197
4,375,207 3/1983 Sieber et al. ....................... 123/333
4,432,430 2/1984 Lind et al. .......................... 180/197
4,545,455 10/1985 Kanemura et al. ................ 180/197
4,554,990 11/1985 Kamiya et al. ..................... 180/197
4,573,440 3/1986 Pischke et al. ..................... 123/333
4,615,316 10/1986 Yasuhara ........................... 123/333

FOREIGN PATENT DOCUMENTS 58-167845 10/1983 Japan .

Primary Examiner—John J. Love
Assistant Examiner—Charles R. Watts
Attorney, Agent, or Firm—Howard N. Conkey

[57] ABSTRACT

This invention relates to a traction control system for a vehicle that combines the control of both air and fuel delivered to the vehicle engine for limiting the slip of the vehicle driven wheels.

5 Claims, 7 Drawing Figures

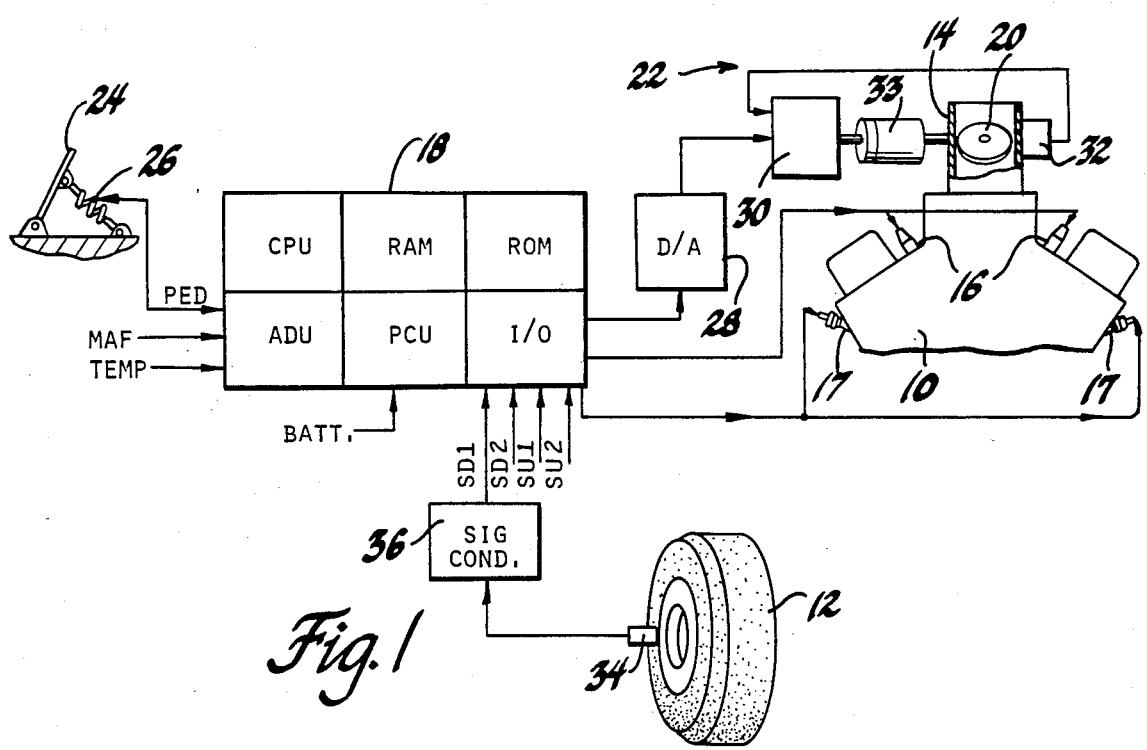
Fig. 1
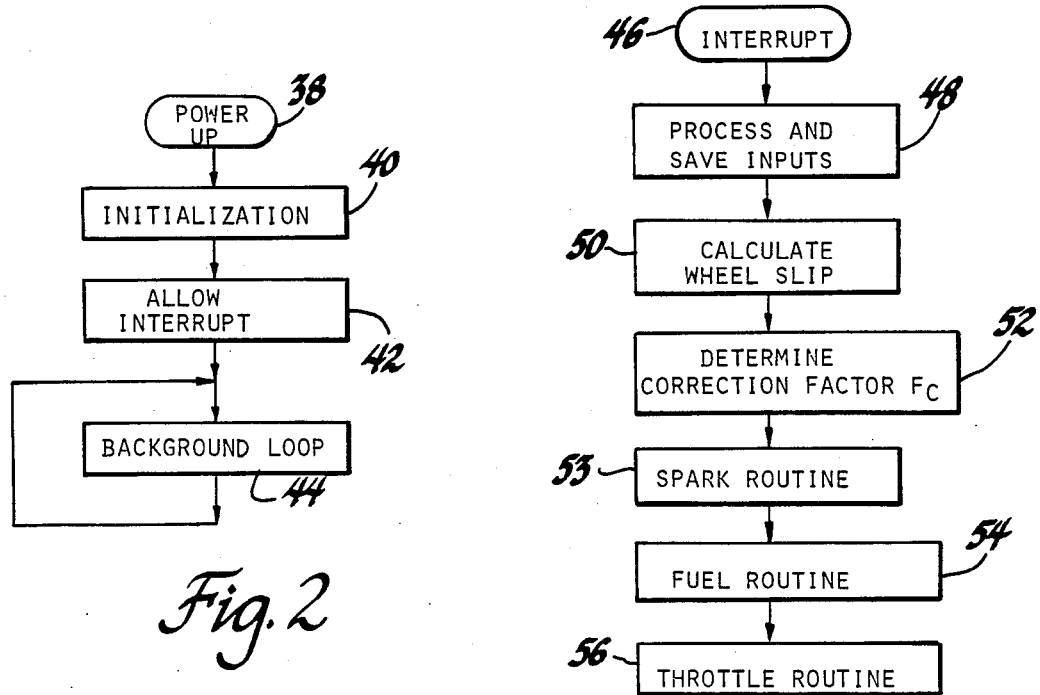
Fig. 2
Fig. 3

VEHICLE TRACTION CONTROL SYSTEM

This is a continuation-in-part of Ser. No. 874,073, filed June 13, 1986, now abandoned.

This invention relates to a vehicle traction control system and more particularly to such a system which limits the drive wheel torque input in the event of excess wheel slip.

It is a common experience with automotive vehicles for excess wheel slip or spinning to occur during vehicle acceleration. This happens when the operator initiated engine torque delivered to the driven wheels are such that the frictional forces between the tire and the road are overcome. While a small amount of slip between the tire and road surface is necessary in order to achieve a driving force, excessive slip results in the reduction of effective driving force or traction.

It has previously been proposed to limit the torque input to the driven wheels in response to a densed wheel slip condition indicating loss of traction such as by throttling the intake of the engine, because of the inherent delays in this form of system including delays in positioning the throttling apparatus and in the induction process, a large slip excursion would typically result in response to a large acceleration input by the vehicle operator.

It is desirable to decrease the response time of the system for limiting wheel slip to as small a time as possible to thereby limit slip excursion in response to rapid increases in the torque applied to the vehicle driven wheels.

In accord with the present invention, a slip condition is detected based on a comparison of the speeds of the vehicle driven and undriven wheels. When an excessive slip condition is sensed, the rate of the fuel delivery to the engine is immediately decreased and/or the spark advance angle is immediately reduced in order to immediately reduce the torque applied to the driven wheels to thereby limit the slip condition. Simultaneously, the system operates to reduce the airflow into the engine to reduce the engine torque. However, because of inherent delays in the system for reducing the airflow, the resulting torque reduction lags the torque reduction based on fuel and spark control. The decrease in the fuel delivered to the engine and the reduction of the spark advance angle to quickly reduce the torque input to the driven wheels is limited to a short time duration based generally on the delay of the control of the airflow into the engine for torque limiting. This minimizes the emission of certain undesirable exhaust gas components resulting from the advanced spark and excursion of the air/fuel ratio resulting from reducing the fuel flow which is normally controlled in response to airflow into the engine. By limiting the slip in this manner, a large excursion in wheel slip is prevented so as to maintain wheel traction forces even in response to rapid increases in the torque supplied to the driven wheels while yet minimizing undesirable exhaust gas emissions.

The invention may be best understood by reference to the following description of a preferred embodiment and the drawings in which:

FIG. 1 is a general diagram of an engine control system; and

FIGS. 2–7 are diagrams illustrating the operation of the system of FIG. 1.

Figure 4:
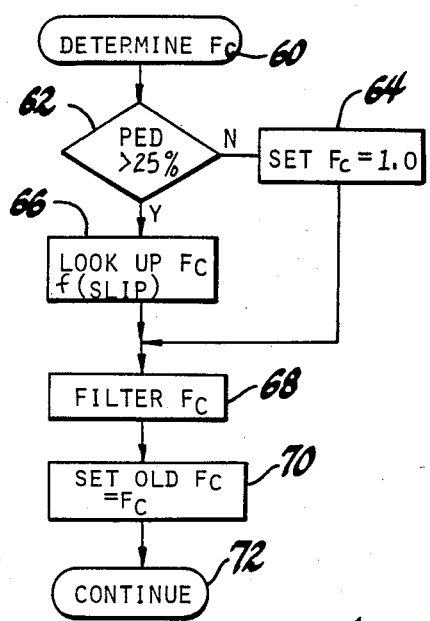

Referring to FIG. 1, there is illustrated a vehicle internal combustion engine 10 that operates to apply driving torque via the conventional vehicle drive train to the vehicle driven wheels, such as the wheel 12. Air is drawn into the engine intake manifold through a throttle bore 14 and mixed with fuel injected into the intake manifold by electromagnetic fuel injectors 16. The air/fuel mixture in turn is drawn into the cylinders of the engine 10 where it is ignited by respective spark plugs 17 undergoes combustion thereby generating the torque applied to the driven wheels. While two fuel injectors are illustrated, it is understood that in the present embodiment a port fuel injection system is utilized wherein an injector is provided for each cylinder of the engine 10.

The injectors 16 are controlled by a digital control unit 18 in response to measured values of engine parameters including mass airflow MAF into the engine 10 and engine temperature TEMP (provided by conventional sensor) so as establish a predetermined air/fuel ratio. The spark plugs 17 are controlled in response to parameters such as mass air flow and engine temperature to establish a desired ignition timing at a scheduled advance angle before cylinder top dead center.

The mass air flow into the engine 10 is controlled by a conventional throttle blade 20 in the throttle bore 14 that is positioned by a drive-by-wire system including the control unit 18 and a closed loop control circuit generally designated as 22. The position of the throttle blade 20 for establishing the airflow into the engine 10 is commanded by the vehicle operator positioned accelerator pedal 24 whose position is sensed by a potentiometer 26 which supplies an electrical signal to the control unit 18 representing the pedal position PED.

The control unit 18 responds to the pedal position signal PED and provides a digital signal to a digital-to-analog converter 28 representing a commanded position of the throttle blade 20. The analog signal output of the converter 28 representing the commanded position is provided to a drive circuit 30 in the closed loop control circuit 22. The drive circuit 30 also receives a signal representing the actual position of the throttle blade 20 from a potentiometer 32 driven by the shaft of the throttle blade 20. The drive circuit 30 is a conventional proportional plus integral circuit that includes an integral term output of an integrator responding to the difference between the commanded throttle position from the converter 28 and the actual position provided by the potentiometer 32 and a proportional term provided by an amplifier responding to the error between the outputs of the converter 28 and the potentiometer 32. The sum of the integral and proportion terms from the circuit 30 are provided to a torque motor 33 which drives the throttle blade 20 to a position in accord with the commanded position from the digital-to-analog converter 28.

In order to provide for traction control, the speed of the driven and undriven wheels are provided to the control unit 18. These signals are in the form of square wave signals $S_{d1}$ and $S_{d2}$ (for the the driven wheels) and $S_{u1}$ and $S_{u2}$ (for the undriven wheels) having a frequency directly proportional to wheel speed. The wheel speed sensors may take the form of an electromagnetic pickup 34 sensing the passing of teeth rotating with the wheel 12. The resulting alternating signal having a frequency related to the speed of the wheel 12 is provided to a signal conditioner 36 which provides the squarewave signal $S_{d1}$ representing the speed of the driven wheel 12. The remaining wheel speed signals are provided in similar manner in response to rotation of the remaining three wheels of the vehicle.

The electronic controller 18 takes the form of a digital computer that is standard in form and includes a central processing unit (CPU) which executes an operating program permanently stored in a read only memory (ROM) which also stores tables and constants utilized in controlling the fuel injected by the injector 16 and in positioning the throttle blade 20 for regulating engine airflow. Contained within the CPU are conventional counters, registers, accumulators, flag flip flops, etc. along with a clock which provides a high frequency clock signal.

The computer also includes a random access memory (RAM) into which data may be temporarily stored and from which data may be read at various address locations determined in accord with the program stored in the ROM. A power control unit (PCU) receives battery voltage and provides regulated power to the various operating circuits in the control unit 18.

The control unit 18 further includes an input/output circuit (I/O) comprised of an input section for receiving the squarewave speed signals representing the speed of the four vehicle wheels and an output section that provides the digital signal to the digital-to-analog converter 28 representing a commanded position of the throttle valve 20, provides a timed injection pulse to the fuel injectors 16 and provides timed signals to the spark plugs 17 to ignite the mixture in the individual cylinders. The input/output circuit may also receive an output from a conventional vehicle ignition distributor or other well known engine position transducer in the form of a pulse with each intake event. These pulses are utilized by the control unit 18 for initiating the injection pulses to the injectors 16 and the spark signals to the spark plugs 17. The input/output circuit also includes an input counter section which receives the pulse outputs of the signal conditioners such as the conditioner 36 representing the speed of the four vehicle wheels. The wheel speeds are then determined such as by counting clock pulse between wheel speed pulses. Alternatively, a separate computer may be utilized for receiving and processing the wheel speed inputs so as to establish the four wheel speeds. These speeds would then be available to the control unit 18 for traction control as will be described.

The control unit 18 further includes an analog-to-digital unit (ADU) which provides for measurement of the analog signals including the pedal position signal PED, the signal representing mass air flow MAF and the signal representing engine temperature TEMP. These signals are sampled and converted under control of the CPU and stored in ROM designated RAM memory locations.

The operation of the control unit 18 in controlling the position of the throttle blade 20, the fuel injectors 16 and the spark plugs 17 and in providing traction control in accord with the principles of this invention is illustrated in FIGS. 2-6. Referring first to FIG. 2, when power is first applied to the system such as when the vehicle ignition switch is rotated to its "on" position, the computer program is initiated at point 38 and then proceeds to a step 40 where the control provides for system initialization. For example, at this step initial values stored in the ROM are entered into ROM designated RAM memory locations and the counters, flags and timer are initialized.

After the initialization step 40, the program proceeds to a step 42 where the program allows interrupts to occur and then to a background loop 44 which is continuously repeated. This loop may include, for example, diagnostic routines. The background loop 44 is interrupted at repeated intervals during which routines for controlling the fuel injectors 16, the spark plugs 17 and the throttle blade 20 are executed. Following execution of these routines, the program again returns to the background loop 44 until the next interrupt is provided. The interrupted interval may be established by means of a counter clocked by the high frequency clock in the CPU and which provides interrupt pulses to an interrupt interval may be provided by embodiment, the interrupt interval may be provided by the CPU at 10 millisecond intervals.

Referring to FIG. 3, the various subroutines executed during the interrupt routine upon interruption of the background loop 44 are illustrated. The interrupt routine is entered at point 46 and proceeds to a step 48 where the control unit 18 processes and saves the various inputs thereto including the signals PED, MAF and TEMP supplied to the ADU of the control unit 18 and the four wheel speed signals provided to the I/O thereof.

From step 48, the program proceeds to a step 50 where the program calculates wheel slip. In general, slippage of the driven wheels of the vehicle is represented by the difference in speed between the driven and undriven wheels. While other expressions may be used, in this embodiment wheel slip is determined by the expression $(S_d - S_u)/S_u$, where $S_d$ is the speed of the fastest driven wheel and $S_u$ is the average speed of the two undriven wheels. The determined value of wheel slip is stored in the RAM for use in the traction control routine of this invention.

Next the program proceeds to a step 52 where a correction factor $F_c$ is determined for modifying the otherwise determined values of injection duration and throttle position for limiting the slip in accord with the principles of this invention. This routine will be described in greater detail with respect to FIG. 4.

At step 53, a spark routine is executed for determining the advance timing of the spark pulses to be applied to the spark plugs 17 in response to engine operating parameters and in response to wheel slip for traction control. This routine is illustrated in greater detail in FIG. 6.

At step 54, a fuel routine is executed for determining the width of the pulses to be applied to the fuel injector 16 for establishing the desired air/fuel ratio in response to the measured mass air flow and in response to wheel slip for traction control. This routine is illustrated in greater detail in FIG. 5. Thereafter the program proceeds to a step 56 where a throttle routine is executed for determining the desired position of the throttle valve 20 in response to the measured position of the pedal 24 and in response to wheel slip for traction control. This routine is illustrated in detail in FIG. 7.

Additional routines not illustrated may be executed in the interrupt routine of FIG. 3, including such routines as spark control and idle speed. Following execution of all of the sub-routines of the interrupt routine of FIG. 3, the program exits the routine at step 58 and returns to the background loop 44 of FIG. 2. The routine of FIG. 3 is repeatedly executed in the aforementioned manner with each interrupt of the background loop 44 of FIG. 2.

Referring to FIG. 4, the routine for determining the correction factor $F_c$ is illustrated. This factor is a multiplication factor equal to one or less to be applied to the injection pulse width and to the throttle blade position otherwise determined by the control unit 18 so as to provide for traction control. For example, a correction factor equal to one would result in no modification of the injection pulse width and throttle blade position values otherwise established by the control unit 18. However, values less than one would result in a decrease in the throttle position and the fuel pulse width determined by the control unit 18 as a function of the magnitude of wheel slip so as to provide for a limiting of the torque output of the engine 10.

The routine for determining the correction factor $F_c$ is entered at point 60 and proceeds to a step 62 where the pedal position PED is compared with a calibration constant representing a percent of maximum pedal position below which it is not desirable to further reduce the resulting commanded throttle position even if wheel slip is detected. In this embodiment, the value of the pedal position is compared with a value representing 25% of maximum value. If the pedal position is less than 25% of maximum position, the program proceeds to a step 64 where the correction factor $F_c$ is set equal to one so that the fuel injection pulses and the throttle position values established by the control unit 18 are unmodified.

If, however, the pedal position is greater than 25% of the maximum travel, the program proceeds to a step 66 where the value of the correction factor $F_c$ is obtained from a look-up table of values stored in the ROM as a function of the magnitude of wheel slip calculated at step 50 of FIG. 3. In general, the look-up table of values may provide any desired functional relationship between the correction factor $F_c$ and wheel slip. In one embodiment, $F_c$ may simply be a step function having a value of one for values of wheel slip less than a predetermined constant and a value of zero for wheel slips in excess of the predetermined constant so as to totally close the throttle value 20 and terminate injection of fuel to the engine 10. In another embodiment, the relationship between the correction factor $F_c$ may be such that the correction factor progressively decreases with increasing values for wheel slip so as to limit the torque applied to the driven wheels by the engine 10 as a function of wheel slip. In this embodiment, the correction factor may be decreased to a value of zero when the wheel slip exceeds a predetermined value. As previously described, the value of the correction factor $F_c$ will be utilized to (A) decrease the fuel quantity injected into the engine so as to substantially instantaneously reduce the torque output of the engine to limit wheel slip and (B) decrease the throttle position to limit air flow into the engine to thereby reduce (after inherent system delays) the engine torque output. As will be described, the reduction of fuel to the engine 10 is momentary and in conjunction with the control of spark advance, provides a quick response to a sensed wheel slip. The reduction in the fuel supply to the engine has a duration sufficient to allow movement of the throttle blade 14 to a reduced position to establish traction control via reduced air flow. Thereafter, the fuel pulse width applied to the fuel injectors 16 is dependent solely upon the sensed mass air flow into the engine to establish a desired air/fuel ratio.

Returning again to FIG. 4, the program proceeds from step 64 or step 66 to a step 68 where the value of the correction factor $F_c$ is filtered based on the prior value and the newest value established at step 66. The step 68 may employ a first order lag filter incorporating the latest determined correction factor $F_c$ to establish an updated filtered value. From step 68 the program proceeds to a step 70 where a RAM memory location storing the last determined average value of the correction factor $F_c$ is updated with the value determined at step 68. This value is utilized when the program again returns to step 68 in providing a filtered value of the correction factor. From step 70, the program exits the routine at step 72.

Figure 5:
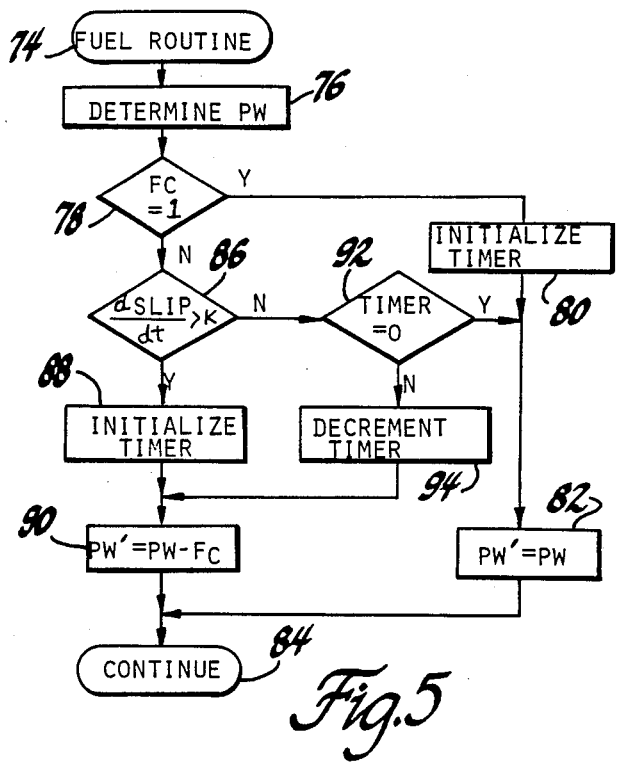

Referring to FIG. 5, the fuel routine for determining the fuel injection pulse width to be applied to the fuel injectors 16 begins at step 74 and proceeds to a step 76 where the fuel pulse width PW to be injected at each intake event is determined based on the mass air flow MAF into the engine 10 and a desired air/fuel ratio that may normally be the stoichiometric ratio but may be other ratios dependent upon engine operating parameters including engine temperature TEMP.

Next, a step 78 is executed where it is determined whether or not the correction factor $F_c$ is equal to one. If equal to one indicating that no correction is required for traction control, the program proceeds to a step 80 where a timer is initialized to a predetermined value. The timer may comprise a RAM memory location in which the predetermined time value is set.

From step 80, the program proceeds to a step 82 where the fuel pulse width PW' to be injected into the engine is set equal to the fuel pulse width PW determined at step 76. As previously indicated, this pulse width was determined to be the width for producing the desired engine air/fuel ratio. From step 82, the program exits the fuel routine at step 84.

Returning to step 78, if the correction factor $F_c$ is less than one indicating a requirement to reduce the torque output of the engine in response to the wheel slip calculated at step 50, the program proceeds to a step 86 where the rate of change of wheel slip is compared to a calibration constant K. If the rate of change in wheel slip is greater than the value K, the program proceeds to a step 88 where the timer previously referred to is initialized to the predetermined time value. Thereafter, the program proceeds to a step 90 where the pulse width PW' provided to the I/O and issued to the fuel injector 16 is set equal to the pulse width determined at step 76 times the average correction factor $F_c$ established by the routine of FIG. 4. This reduced fuel pulse width is provided to the I/O of the control unit 18 to be issued to the fuel injector 16. By this reduction of the fuel quantity delivered to the engine 10 in cooperation with the spark advance control to be described, an immediate decrease in the torque output of the engine is effected to reduce the slip of the driven tires to provide traction control. From step 90, the program exist the routine at step 84.

Returning to step 86, whenever the rate of change in wheel slip is less than the constant K, the reduced pulse width is issued to the fuel injectors 16 for the predetermined time period established at step 80 or step 88. This is accomplished by proceeding first to a step 92 where the state of the timer is compared to zero. If not equal to zero, the program proceeds to a step 94 where the timer is decremented after which the program again returns to the step 90 at which the fuel pulse width provided to the I/O of the control unit 18 is reduced by the average control factor $F_c$. The foregoing steps are repeated until the timer has been decremented to zero after which the program proceeds from the step 92 to the step 82 where the pulse width is again increased to the value determined at 76 to produce the desired air/fuel ratio.

In summary, the function of the fuel routine of step 54 is to provide a quantity of fuel to the engine 10 to establish a predetermined air/fuel ratio. However upon the detection of excessive wheel slip, the fuel quantity injected into the engine 10 is immediately reduced by an amount dependent upon the magnitude of wheel slip so as to provide an instantaneous reduction of the torque input to the driven wheels. The duration of such reduction (established at step 80 or 88) allows the throttle routine to be described with reference to FIG. 7 to position the throttle to reduce the mass air flow into the engine to effect the required torque reduction after which the fuel pulse width is again returned to the value establishing the desired air/fuel ratio.

Figure 6:
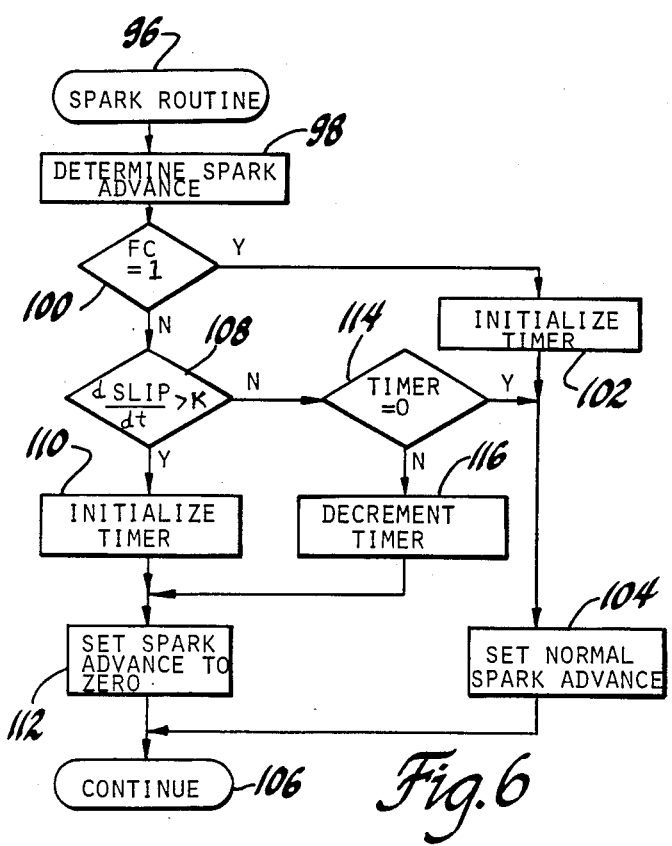

Referring to FIG. 6, the fuel routine for determining the advance timing of the pulses to be applied to the spark plugs 17 begins at step 96 and proceeds to a step 98 where the spark advance of the spark pulses is determined based on parameters such as the mass air flow MAF into the engine 10 and engine temperature.

Next, a step 100 is executed where it is determined whether or not the correction factor $F_c$ is equal to one. If equal to one indicating that no control is required for traction control, the program proceeds to a step 102 where a timer is initialized to a predetermined value which in this embodiment is equal to the value established at step 80 in the fuel routine of FIG. 5. The timer may comprise a RAM memory location in which the predetermined time value is set.

From step 102, the program proceeds to a step 104 where the spark advance value of the pulses provided to the spark plugs by the I/O is set equal to the value determined at step 98. From step 104, the program exits the fuel routine at step 106.

Returning to step 100, if the correction factor $F_c$ is less than one indicating a requirement to reduce the torque output of the engine in response to the wheel slip calculated at step 50, the program proceeds to a step 108 where the rate of change of wheel slip is compared to the calibration constant K. If the rate of change in wheel slip is greater than the value K, the program proceeds to a step 110 where the timer previously referred to is initialized to the predetermined time value. Thereafter, the program proceeds to a step 112 where the spark advance PW' provided to the I/O is set equal to zero. By this reduction in the advance timing, an immediate decrease in the torque output of the engine in addition to the torque reduction resulting from the decreased fuel amount as previously described is effected to reduced the slip of the driven tires to provide traction control. From step 112, the program exits the routine at step 106.

Returning to step 108, whenever the rate of change in wheel slip is less than the constant K, the spark pulse at the reduced advanced value is issued to the spark plugs 17 for the predetermined time period established at step 102 or step 110. This is accomplished by proceeding first to a step 114 where the state of the timer is compared to zero. If not equal to zero, the program proceeds to a step 116 where the timer is decremented after which the program again returns to the step 112 at which the advance timing of the spark pulse is set to zero. The foregoing steps are repeated until the timer has been decremented to zero after which the program proceeds from the step 114 to the step 104 where the advance timing of the spark pulse is set to the value established at step 98.

In summary, the function of the spark routine of step 53 is to establish the desired advance timing of the spark pulses provided to the spark plugs 17. However, upon the detection of excessive wheel slip, the advance timing is immediately set to zero so as to provide an instantaneous reduction of the torque input to the driven wheels. As with the fuel routine 54, the duration of the reduced spark advance allows the throttle routine next to be described to position the throttle to reduce the mass air flow into the engine to effect the required torque reduction after which the advance timing value (as well as the fuel pulse width) is again returned to the normal value.

Figure 7:
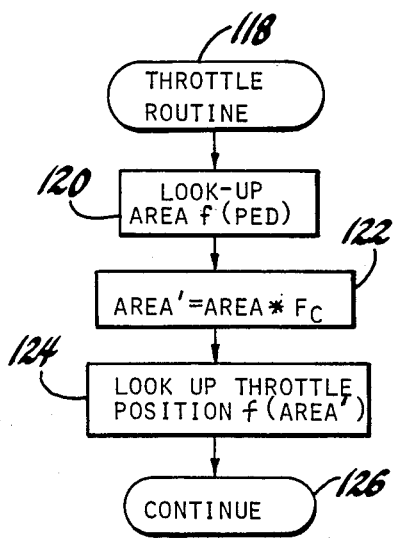

Referring to FIG. 7, the throttle routine is entered at point 118 and proceeds to a step 120 where the commanded area of the effective orifice established by the throttle blade 20 in the throttle bore 14 as commanded by the position of the pedal 24 is determined by a look-up table of values in the ROM of the control unit 18 in which the commanded area is retrieved from the look-up table as a function of the pedal position PED. From step 120, the program proceeds to a step 122 where the commanded area is adjusted by the average correction factor $F_c$ determined at step 52 of FIG. 3 so that the commanded area is reduced as a function of the magnitude of the wheel slip calculated at step 50.

At step 124, the program obtains the throttle position corresponding to the area established at step 122 from another look-up table of values in the ROM of the control unit 18 that contains a schedule of values of throttle position as a function of throttle bore area. This value is issued in digital form to the digital-to-analog converter 28 which, in turn, supplies an analog signal to the closed loop controller 22. The controller 22 functions to establish the commanded throttle position by closed loop control as previously described. Thereafter, the program exits the throttle routine at step 126.

The positioning of the throttle blade 20 in response to the command determined by the pedal 24 position and adjusted by the correction factor $F_c$ includes inherent delays including the delays required for the closed loop controller 22 to position the throttle blade 20 to the commanded position. Accordingly, in response to a sensed wheel slip at step 50, a time period is required for the throttle blade 20 to be moved to the new position determined by the correction factor $F_c$ determined at step 52. When the throttle position is established, the resulting torque reduction in the output of the engine is effective to reduce the wheel slip and provide for traction control. During the delay required to reposition the throttle blade 20, the fuel and spark routines described with respect to FIGS. 5 and 6 provide an instantaneous reduction in the torque output of the engine to provide traction control to thereby prevent a large wheel slip excursion. The control of the fuel and advance timing in order to reduce the torque output of the engine 10 is established for a limited time period generally required for the throttle blade 20 to be repositioned to effect the required torque reduction.

The foregoing description of a preferred embodiment for the purpose of describing the invention is not to be considered as limiting or restricting the invention since many modifications may be made by the exercise of skill in the art without departing from the scope of the invention.

The embodiment of the invention in which an exclusive property or privilege is claimed are defined as follows:

1. A traction control system for a vehicle having an internal combustion engine with combustion chambers into which an air and fuel mixture is drawn and ignited to undergo combustion, a wheel driven by the engine and a non-driven wheel, the driven wheel being liable to slipping in the event excessive torque is applied thereto by the engine, the system comprising, in combination:

air flow control means including a throttle valve for regulating mass air flow into the engine in response to a vehicle operator air flow command;

means for determining driven wheel slip that is a function of the difference between the driven and undriven wheel speeds; and means responsive to predetermined excessive values of the determined driven wheel slip for (A) adjusting the air flow control means to reduce, after an air flow control delay, the mass air flow into the engine to reduce the torque applied to the driven wheel after the air flow control delay and (B) adjusting a predetermined engine parameter to produce a substantially instantaneous reduction in the torque applied to the driven wheel for a predetermined time period substantially equal to the air flow control delay to provide a reduction in torque applied to the driven wheel by the engine during the air flow control delay.

2. The traction control system of claim 1 further including fuel control means for supplying fuel to the engine at a rate establishing a predetermined air/fuel ratio and wherein (A) the predetermined engine parameter is the rate of fuel supplied to the engine and (B) the adjustment to the predetermined engine parameter is a reduction in the rate of fuel supplied to the engine independent of the predetermined air/fuel ratio.

3. The traction control system of claim 1 further including ignition control means for ignitiong the air and fuel mixture in the combustion chambers at a predetermined ignition advance angle and wherein (A) the predetermined engine parameter is the ignition advance angle and (B) the adjustment to the predetermined engine parameter is a reduction of the ignition advance angle.

4. A traction control system for a vehicle having an internal combustion engine with combustion chambers into which an air and fuel mixture is drawn and ignited to undergo combustion, a wheel driven by the engine and a non-driven wheel, the driven wheel being liable to slipping in the event excessive torque is applied thereto by the engine, the system comprising, in combination:

air flow control means including a throttle valve for regulating mass air flow into the engine in response to a vehicle operator air flow command;

fuel control means for supplying fuel to the combustion chambers of the engine at a rate establishing a predetermined air/fuel ratio;

ignition control means for igniting the air and fuel mixture in the combustion chambers at a predetermined ignition advance angle;

means for determining driven wheel slip that is a function of the difference between the driven and undriven wheel speeds; and means responsive to predetermined excessive values of the determined driven wheel slip for (A) adjusting the air flow control means to reduce, after an air flow control delay, the mass air flow into the engine to reduce the torque applied to the driven wheel after the air flow control delay, (B) reducing the rate of fuel supplied to the engine for a predetermined time period substantially equal to the air flow control delay independent of the predetermined air/fuel ratio and (C) reducing the ignition advance angle of the igniting of the air and fuel mixture for the predetermined time period, whereby the reduction in the fuel supplied and the ignition advance angle provide a reduction in the torque applied to the driven wheel by the engine during the air flow control delay.

5. A traction control system for a vehicle having an internal combustion engine with combustion chambers into which an air and fuel mixture is drawn and ignited to undergo combustion, a wheel driven by the engine and a non-driven wheel, the driven wheel being liable to slipping in the event excessive torque is applied thereto by the engine, the system comprising, in combination:

an accelerator pedal for operation by a vehicle operator to control the mass air flow into the engine;

air flow control means including (A) a throttle valve for regulating mass air flow into the engine, (B) means for generating a throttle position command signal in response to the operation of the accelerator pedal and (C) means for positioning the throttle valve in accord with the throttle position command signal between a closed position for minimum mass air flow into the engine and an open position for maximum mass air flow into the engine;

fuel control means for supplying fuel to the engine at a rate establishing a predetermined air/fuel ratio;

ignition control means for igniting the air and fuel mixture in the combustion chambers at a predetermined ignition advance angle;

means for determining the value of driven wheel slip that is a function of the difference between the driven and undriven wheel speeds; and means responsive to predetermined excessive values of the determined driven wheel slip for (A) reducing the throttle position command signal by a factor related to the value of the driven wheel slip so that the throttle valve is moved, after a control delay, toward the closed position to reduce the mass air flow into the engine to reduce the torque applied to the driven wheel, (B) reducing the rate of fuel supplied to the engine by the fuel control means for a predetermined time period substantially equal to the control delay independent of the predetermined air/fuel ratio and (C) reducing the ignition advance angle of the igniting of the air and fuel mixture for the predetermined time period, whereby the reduction in the rate of fuel supplied and the ignition advance angle provide a reduction in torque applied to the driven wheel by the engine during the air flow control delay, whereby the slip of the driven wheel is limited to provide traction control.

* * * * *